(12) United States Patent
Schoeffer et al.

(10) Patent No.: US 12,430,600 B2
(45) Date of Patent: Sep. 30, 2025

(54) STRATEGIC PLANNING USING DEEP LEARNING

(71) Applicant: International Business Machines Corporation, Armonk, NY (US)

(72) Inventors: Jakob Schoeffer, Hasloch (DE); Michelle Morales, Franklin Square, NY (US); Amir Sabet Sarvestani, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 17/091,132

(22) Filed: Nov. 6, 2020

(65) Prior Publication Data

US 2022/0147896 A1 May 12, 2022

(51) Int. Cl.
*G06Q 10/00* (2023.01)
*G06N 20/00* (2019.01)
(Continued)

(52) U.S. Cl.
CPC ....... *G06Q 10/06375* (2013.01); *G06N 20/00* (2019.01); *G06Q 30/0201* (2013.01); *G06Q 50/01* (2013.01)

(58) Field of Classification Search
None
See application file for complete search history.

(56) References Cited

U.S. PATENT DOCUMENTS

| 5,970,482 A | 10/1999 | Pham et al. |
| 6,289,344 B1 | 9/2001 | Braia et al. |

(Continued)

FOREIGN PATENT DOCUMENTS

| KR | 100751965 B1 | 8/2007 | |
| WO | WO-2017055878 A1 * | 4/2017 | ........... G06K 9/3241 |

OTHER PUBLICATIONS

Soumen Chakrabarti et al. (Mining the Web Discovering knowledge from hypertext data, Indian Institute of Technology Bombay, Apr. 12, 2002). (Year: 2002).*

(Continued)

*Primary Examiner* — Hafiz A Kassim
(74) *Attorney, Agent, or Firm* — Shackelford, McKinley & Norton, LLP; Robert A. Voigt, Jr.

(57) ABSTRACT

A computer-implemented method, system and computer program product for developing a strategic plan by a strategic planning system. The strategic planning system collects structured and unstructured data. The collected structured and unstructured data is then aggregated by the strategic planning system. A client's needs and interests are then defined based on analyzing the aggregated collected data. Such needs and interests may be identified using natural language processing and a statistical model, where the statistical model includes words that are associated with a need or interest. The strategic planning system further labels the aggregated data with labels that contain vectors of interest across different areas. A supervised deep learning model is then trained to predict future needs and interests of the client based on the aggregated collected data and the labels. The predicted future need and interest of the client is then matched with a solution using a recommender system.

14 Claims, 4 Drawing Sheets

(51) Int. Cl.
*G06Q 10/0637* (2023.01)
*G06Q 30/0201* (2023.01)
*G06Q 50/00* (2012.01)

(56) References Cited

U.S. PATENT DOCUMENTS

| | | |
|---|---|---|
| 7,249,048 B1 | 7/2007 | O'Flaherty |
| 7,729,940 B2 | 6/2010 | Harvey et al. |
| 9,535,902 B1* | 1/2017 | Michalak ............ G06F 16/3331 |
| 10,970,641 B1* | 4/2021 | Flowers ................ G06Q 30/01 |
| 2003/0009368 A1 | 1/2003 | Kitts |
| 2003/0033192 A1 | 2/2003 | Zyman et al. |
| 2004/0064357 A1 | 4/2004 | Hunter et al. |
| 2004/0199422 A1 | 10/2004 | Napier et al. |
| 2005/0097028 A1* | 5/2005 | Watanabe ............. G06Q 40/02 |
| | | 705/37 |
| 2006/0156222 A1* | 7/2006 | Chi ....................... G06F 40/169 |
| | | 707/E17.058 |
| 2006/0242154 A1* | 10/2006 | Rawat ................... G06F 16/168 |
| 2009/0307060 A1 | 12/2009 | Merz et al. |
| 2010/0161379 A1 | 6/2010 | Bene et al. |
| 2010/0235164 A1* | 9/2010 | Todhunter ............. G06F 40/35 |
| | | 704/9 |
| 2010/0241639 A1* | 9/2010 | Kifer .................... G06F 16/313 |
| | | 707/754 |
| 2010/0262487 A1 | 10/2010 | Edwards et al. |
| 2011/0106584 A1 | 5/2011 | Borthwick et al. |
| 2011/0289026 A1* | 11/2011 | Kannan ................. G06Q 30/00 |
| | | 707/E17.014 |
| 2012/0166438 A1* | 6/2012 | Wu ...................... G06F 16/3322 |
| | | 707/E17.069 |
| 2014/0108308 A1* | 4/2014 | Stout .................. G06Q 30/0241 |
| | | 706/20 |
| 2014/0201126 A1* | 7/2014 | Zadeh ..................... A61B 5/165 |
| | | 706/52 |
| 2014/0278406 A1* | 9/2014 | Tsumura ................ G06Q 40/00 |
| | | 704/235 |
| 2015/0006294 A1* | 1/2015 | Irmak .................. G06Q 30/0269 |
| | | 705/14.66 |
| 2015/0310862 A1* | 10/2015 | Dauphin ................ G06F 40/30 |
| | | 704/257 |
| 2017/0061294 A1* | 3/2017 | Weston ................. G06F 16/334 |
| 2018/0101791 A1* | 4/2018 | Viswanathan .......... G06N 20/20 |
| 2018/0341839 A1 | 11/2018 | Malak et al. |
| 2019/0026759 A1 | 1/2019 | Ratnaswamy et al. |
| 2019/0147366 A1* | 5/2019 | Sankaran .................. G06N 3/04 |
| | | 706/12 |
| 2019/0180358 A1* | 6/2019 | Nandan .................. G06N 20/00 |
| 2019/0258671 A1* | 8/2019 | Bou ........................ G06F 40/30 |
| 2019/0258933 A1* | 8/2019 | Baughman .............. G06N 3/084 |
| 2019/0266288 A1* | 8/2019 | Shukla ................ G06F 16/9535 |
| 2020/0279105 A1* | 9/2020 | Muffat ..................... G06N 3/08 |
| 2020/0310888 A1* | 10/2020 | Gopalan .................. G06F 21/31 |
| 2021/0049700 A1* | 2/2021 | Nguyen ................. G06N 20/20 |
| 2021/0166251 A1* | 6/2021 | Mehmanpazir ........ G06N 20/20 |
| 2021/0192387 A1* | 6/2021 | Benson .................. G06N 20/10 |
| 2021/0241036 A1* | 8/2021 | Benkreira .............. G06N 20/00 |

OTHER PUBLICATIONS

Ursin Brunner and Kurt Stockinger (Entity Matching on Unstructured Data: An Active Learning Approach, 2019 IEEE). (Year: 2017).*
Albert Weichselbraun, Gerhard Wohlgenannt, and Arno Schar (Refining non-taxonomic relation labels with external structured data to support ontology learning, Data & Knowledge Engineering 69 (2010) 763-778). (Year: 2010).*
Robert M. Losee (Browsing mixed structured and unstructured data, Information Processing and Management 42 (2006) 440-452). (Year: 2006).*
Antonio Moreno and Teófilo Redondo (Text Analytics: the convergence of Big Data and Artificial Intelligence, DOI: 10.9781/ijimai.2016.369). (Year: 2016).*
IBM cloud education "deep learning," May 1, 2020 (Year: 2020).*
Nikado et al., "Modelling Client Needs and Satisfaction in the Built Environment," 17th Annual ARCOM Conference, Sep. 5-7, 2001, University of Salford, Association of Researchers in Construction Management, vol. 1, 2001, pp. 917-927.
Fitzpatrick et al., "A Holistic Approach for the Architecture and Design of an Ontology-Based Data Integration Capability in Product Master Data Management," IFIP Advances in Information and Communication Technology, vol. 388, 2012, pp. 559-568.
Corwin, et al. "Dynamic tables: an architecture for managing evolving, heterogeneous biomedical data in relational database management systems." Journal of the America Medical Informatics Association 14.1, 2007, pp. 86-93.
Miloslavskaya et al., "Big data, fast data and data lake concepts." Procedia Computer Science 88, 2016, pp. 300-305.
Schuler et al., "Digital asset management for heterogeneous biomedical data in an era of data-intensive science." 2014 IEEE International Conference on Bioinformatics and Biomedicine (BIBM). IEEE, 2014, 08 pages.
Teucke et al., "Globus Auth: A Research Identity and Access Management Platform", 2016 IEEE 12th International Conference on e-Science (e-Science), Oct. 23-27, 2016, 10 pages, DOI: 10.1109/eScience.2016.7870901.

* cited by examiner

STRATEGIC PLANNING USING DEEP LEARNING

TECHNICAL FIELD

The present disclosure relates generally to strategic planning systems, and more particularly to strategic planning using deep learning.

BACKGROUND

Strategic planning is an organization's process of defining its strategy, or direction, and making decisions on allocating its resources to pursue this strategy. It is here that priorities are set. It may also extend to control mechanisms for guiding the implementation of the strategy. Strategic planning is executed by strategic planners or strategists, who involve many parties and research sources in their analysis of the organization and its relationship to the environment in which it competes.

Strategy generally involves setting strategic goals, determining actions to achieve the goals, and mobilizing resources to execute the actions. A strategy describes how the ends (goals) will be achieved by the means (resources). The senior leadership of an organization is generally tasked with determining strategy. Strategy can be planned (intended) or can be observed as a pattern of activity (emergent) as the organization adapts to its environment or competes.

Typically, strategists, such as the senior leadership of an organization, utilize strategic planning systems in defining the organization's strategy and making decisions on allocating its resources to pursue this strategy. For example, such strategic planning systems may be utilized to develop a strategy for the organization to develop business with existing and potential customers or clients.

SUMMARY

In one embodiment of the present disclosure, a computer-implemented method for developing a strategic plan by a strategic planning system comprises defining a client's needs and interests based on analyzing structured and unstructured data. Furthermore, the method comprises labeling the structured and unstructured data with labels, where the labels contain vectors of interest across different areas, where a value of each area is proportional to the client's defined needs and interests for that area. Additionally, the method comprises training a supervised deep learning model to predict future needs and interests of the client based on the structured and unstructured data and the labels. In addition, the method comprises matching a solution with a future need and interest of the client predicted by the supervised deep learning model using a recommender system.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

As stated in the Background section, strategic planning is an organization's process of defining its strategy, or direction, and making decisions on allocating its resources to pursue this strategy. It is here that priorities are set. It may also extend to control mechanisms for guiding the implementation of the strategy. Strategic planning is executed by strategic planners or strategists, who involve many parties and research sources in their analysis of the organization and its relationship to the environment in which it competes.

Strategy generally involves setting strategic goals, determining actions to achieve the goals, and mobilizing resources to execute the actions. A strategy describes how the ends (goals) will be achieved by the means (resources). The senior leadership of an organization is generally tasked with determining strategy. Strategy can be planned (intended) or can be observed as a pattern of activity (emergent) as the organization adapts to its environment or competes.

Typically, strategists, such as the senior leadership of an organization, utilize strategic planning systems in defining the organization's strategy and making decisions on allocating its resources to pursue this strategy. For example, such strategic planning systems may be utilized to develop a strategy for the organization to develop business with existing and potential customers or clients.

Strategic planning systems have two major functions: to develop an integrated, coordinated, and consistent long-term plan of action, and to facilitate adaptation of the corporation to environmental change. When introducing and developing such a system, companies commonly concentrate on its integrative aspects. The design of the system, however, should include the function of environmental scanning to make sure that the planning effort also fulfills its adaptive mission.

Unfortunately, such strategic planning systems rely upon users inputting data pertaining to the organization's strengths and superior products. However, such information is limiting in that strategic planning systems are not able to determine the interests and needs of both existing and potential customers or clients, including their future interests and needs, which are needed to be known in order to effectively and efficiently approach such existing and potential customers or clients to generate business for the organization. Furthermore, such information is an excessive amount of information thereby causing strategic planning systems to utilize an excessive amount of computing resources in attempting to derive a strategy for the organization to develop business with existing and potential customers or clients.

The embodiments of the present disclosure provide a means for a strategic planning system to develop a strategic plan using deep learning to determine the interests and needs of the existing and potential clients so as to effectively and efficiently approach the existing and potential clients to generate business for the organization. Furthermore, by utilizing deep learning, computing resources are more efficiently utilized by no longer requiring users to input data pertaining to the organization's strengths and superior products. Instead, the strategic planning system collects and analyzes structured and unstructured data to understand the changing trends and interests in the market and the client's industry, the emerging challenges for the client, the client satisfaction with current products and services, the competiveness of the client's products and services in the market and the potential increase or decrease of business opportunities with the client. Furthermore, in addition to identifying the client's existing and potential interests and needs, the strategic planning system of the present disclosure matches a solution (an answer in addressing the client's needs and interests) to such an identified interest and need using a recommender system as well as identifies the appropriate contact at the client to discuss such a solution by performing a social network analysis.

It is noted that the term "existing client," as used herein, refers to a person or entity who is a customer of the organization or of any of its affiliates. The term "potential client," as used herein, refers to a person or entity whom the organization expects to become their clients in the near future. The term "client," as used herein, includes both existing and potential clients. Furthermore, it is noted that the term "client" is used interchangeably herein with the term "customer," and is intended to have the same meaning as "client."

In some embodiments of the present disclosure, the present disclosure comprises a computer-implemented method, system and computer program product for developing a strategic plan by a strategic planning system. In one embodiment of the present disclosure, the strategic planning system collects structured and unstructured data. "Structured data," as used herein, refers to data that adheres to a predefined data model. Examples of structured data include sales transactions, customer surveys which indicate the client's satisfaction (e.g., a net promotor score may be generated based on responses to customer surveys), marketing responses, global market views, news, etc. "Unstructured data," as used herein, refers to information that either does not have a predefined data model or is not organized in a predefined manner. Examples of such unstructured data include news about the clients, reviews of the clients, content published by the clients, etc. The collected structured and unstructured data is then aggregated by the strategic planning system, such as periodically. A client's needs and interests are then defined based on analyzing the aggregated collected structured and unstructured data. In one embodiment, such needs and interests are identified using natural language processing and a statistical model, where the statistical model includes words that are associated with a need or interest. For example, the words identified from a posted article (one of the articles included in the collected and aggregated data) may be used to identify the need or interest most associated with the posted article. The strategic planning system further labels the aggregated collected structured and unstructured data with labels that contain vectors of interest across different areas, where a value of each area is proportional to the client's defined needs and interests for that area. A supervised deep learning model is then trained to predict future needs and interests of the client based on the aggregated collected data and the labels. In one embodiment, the aggregated collected data corresponds to the features of the supervised deep learning model and the labels correspond to the dependent variables of the supervised deep learning model. The predicted future need and interest of the client is then matched with a solution (an answer in addressing the client's needs and interests) using a recommender system. In one embodiment, the recommender system performs a table look-up for the solution matching the need and interest predicted by the supervised deep learning model. In this manner, the strategic planning system develops a strategic plan using deep learning to determine the interests and needs of the clients so as to effectively and efficiently approach the clients to generate business for the organization. Furthermore, in this manner, the strategic planning system utilizes fewer computing resources (e.g., reducing processing resources) yet still providing a more accurate strategy plan for the organization.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Figure 1:
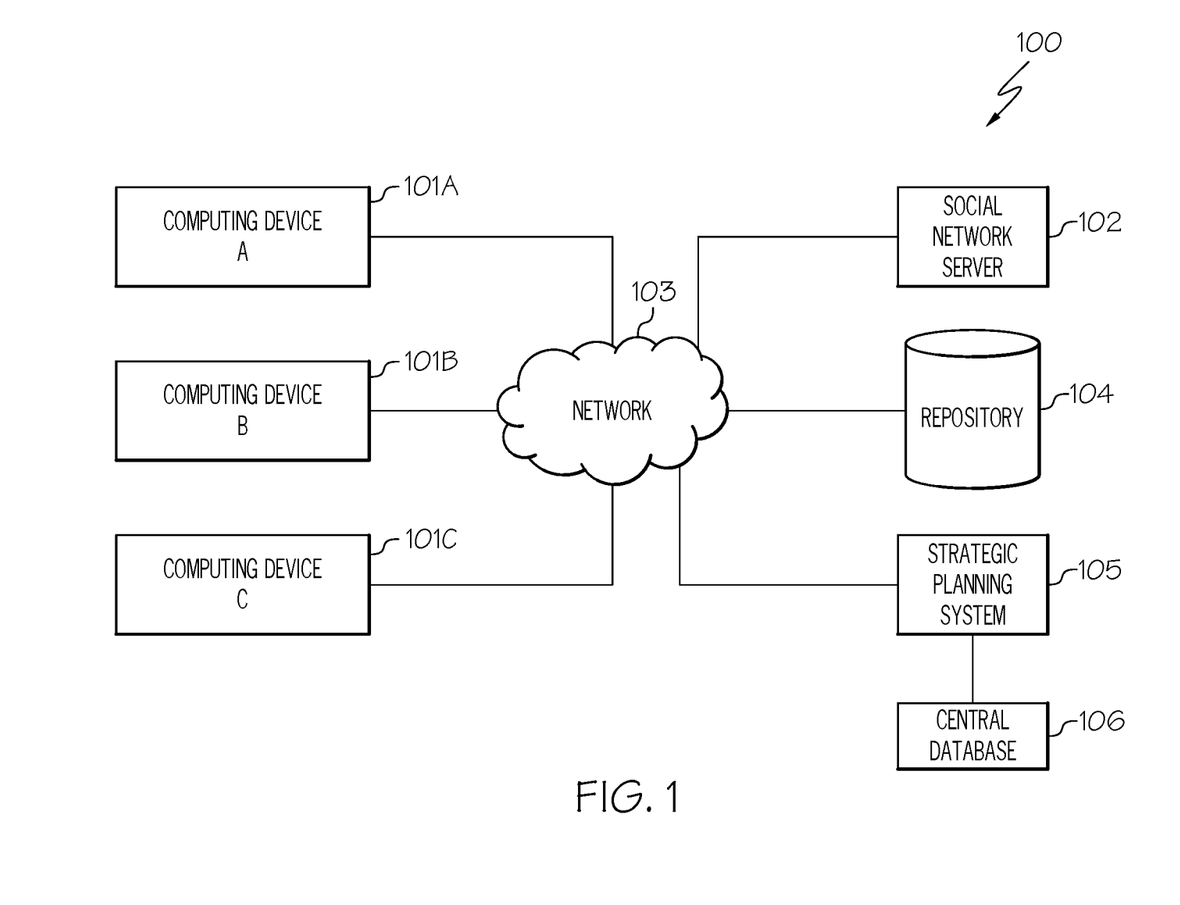
FIG. 1 illustrates a communication system for practicing the principles of the present disclosure in accordance with an embodiment of the present disclosure.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a social network server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and social network server 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

Social network server 102, which may be a web server configured to offer a social networking and/or microblogging service, enables users of computing devices 101 to send and read other users' posts. "Posts," as used herein, include any one or more of the following: text (e.g., comments, sub-comments and replies), audio, video images, etc. Social network server 102, as used herein, is configured to enable various collaborative activities, such as online discussion sites (e.g., public forums). For example, users of computing device 101 may post articles, documents, etc. pertaining to an organization's clients of interest, such as sales transactions, customer surveys which indicate the client's satisfaction (e.g., a net promotor score may be generated based on responses to customer surveys), marketing responses, global market views, news, including news about the clients, reviews of the clients, content published by the clients, etc.

Furthermore, some of this information may reside within repositories, which may be publicly accessible via network 103, such as repository 104 connected to network 103. While FIG. 1 illustrates a single repository, is it noted that system 100 may include multiple repositories 104 storing such information.

Social network server 102 is connected to network 103 by wire or wirelessly. While FIG. 1 illustrates a single social network server 102, it is noted for clarity that multiple servers may be used to implement the social networking and/or microblogging service.

System 100 additionally includes a strategic planning system 105 connected to network 103 to communicate with computing devices 101, social network server 102 and repository 104. In one embodiment, strategic planning system 105 is configured to develop a strategy for an organization to develop business with clients by first identifying the client's needs and interests, matching a solution to such an identified interest and need using a recommender system and then identifying an appropriate contact at the client to discuss such a solution by performing a social network analysis.

A discussion regarding the software components used by strategic planning system 105 to perform such functions is discussed below in connection with FIG. 2.

Figure 2:
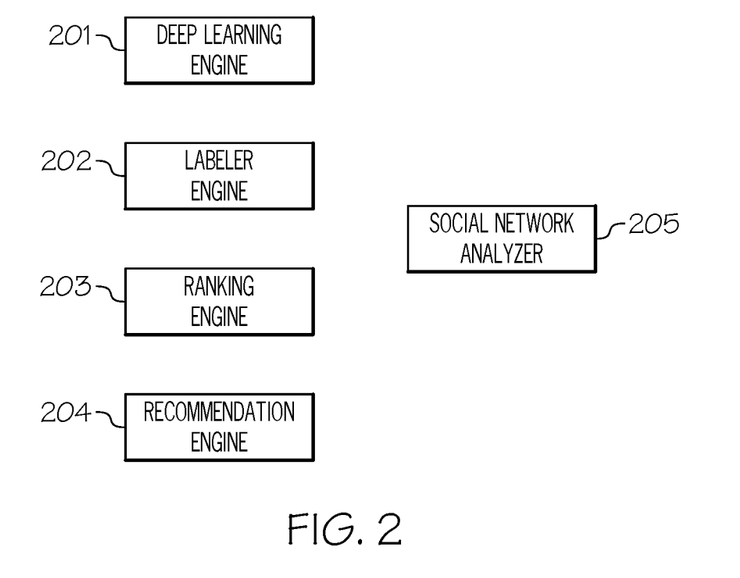
FIG. 2 is a diagram of the software components of the strategic planning system used to develop a strategy for an organization to develop business with clients in accordance with an embodiment of the present disclosure.

FIG. 2 is a diagram of the software components of strategic planning system 105 (FIG. 1) used to develop a strategy for an organization to develop business with clients in accordance with an embodiment of the present disclosure.

Referring to FIG. 2, in conjunction with FIG. 1, strategic planning system 105 includes a deep learning engine 201 configured to predict the client's needs and interests (including the client's future needs and interests) using a supervised deep learning model.

In one embodiment, deep learning engine 201 uses a machine learning algorithm (e.g., supervised learning) to build a mathematical model based on sample data consisting of structured and unstructured data (e.g., sales transactions, customer surveys which indicate the client's satisfaction (e.g., a net promotor score may be generated based on responses to customer surveys), marketing responses, global market views, news, including news about the clients, reviews of the clients, content published by the clients, etc.) to predict the client's needs and interests (including the client's future needs and interests). Such structured and unstructured data may be obtained and tabulated by experts, who in turn, utilize such information to develop the sample data. Such a data set is referred to herein as the "training data" which is used by the machine learning algorithm of deep learning engine 201 to make predictions or decisions without being explicitly programmed to perform the task. The algorithm iteratively makes predictions on the training data and is corrected by the expert until the predictions achieve the desired accuracy. Examples of such supervised learning algorithms include nearest neighbor, Naïve Bayes, decision trees, linear regression, support vector machines and neural networks.

In one embodiment, a recurrent neural network architecture is used to account for the time dependencies of the data.

In one embodiment, the structured and unstructured data, which may be collected and aggregated periodically, including per client, is used as features of the supervised deep learning model. In one embodiment, the labels of such collected and aggregated data (discussed further below in connection with labeler engine 202) is used as dependent variables of the supervised deep learning model.

In one embodiment, strategic planning system 105 includes a labeler engine 202 configured to label the historical data accordingly. Such historic data includes the structured and unstructured data discussed above. In one embodiment, labels are vectors of interest across several areas. For example, the areas of interest may correspond to: [cloud storage, machine learning, security, . . . , marketing automation] resulting in a vector of: [0.3, 0.2, 0.1, . . . , 0.3], where the value of an entry is proportional to the magnitude of the client's need and interest for that area. In one embodiment, the vectors are normalized so that the sum of the entries of any given interest vector sums up to the value of 1. In one embodiment, such normalization is utilized by a softmax activation function in the final layer of the neural network embodiment.

In one embodiment, structured and unstructured data pertaining to the client, including the client's needs and interests are collected and aggregated, such as periodically (e.g., weekly) as well as per client. Such data may be analyzed for data insights, such as the client's needs and interests by labeler engine 202

In one embodiment, labeler engine 202 utilizes natural language processing to identify needs and interests in such collected and aggregated data. For example, labeler engine 202 may identify the needs and interests using a statistical model, where the statistical model includes words that are associated with a need or interest. For example, the words identified from a posted article (one of the articles included in the collected and aggregated data) may be used to identify the need or interest most associated with the posted article. For instance, if the posted article includes a description of the client needing to lease new office space due to an expanded workforce, then terms, such as office space and lease, may be associated with the need or interest in leasing new office space.

In one embodiment, the magnitude of such identified needs and interests is determined based on the volume of data that indicates such a need and interest. For example, multiple articles expressing a need for leasing new office space would cause such a need and interest to be associated with a greater magnitude than the need for an expert involving cloud computing based on a job posted by the client for such a position. In one embodiment, the number of times a need or interest for a potential client is identified is stored in a table. Such information may be used to determine the magnitude of such a need or interest for the potential client. That is, such information may be used to determine the extent of such a need or interest by the potential client.

In one embodiment, the magnitude of such identified needs and interests may be expressed in terms of a value, where the higher the value, the greater the magnitude of the associated need and interest. In one embodiment, the vector of the magnitude of such identified needs and interests is normalized so that the magnitudes sum up to the value of 1 as discussed above.

Referring again to the supervised deep learning model discussed above, in one embodiment, the number of output nodes is selected to equal with the number of need/interest areas that define the length of the vectors.

Furthermore, as shown in FIG. 2, strategic planning system 105 includes a ranking engine 203 configured to rank the needs and interests of the client predicted by deep learning engine 201. In one embodiment, ranking engine 203 ranks the needs and interests of the client based on the ability of the organization to service the predicted needs and interests (including the predicted future needs and interests). In one embodiment, ranking engine 203 utilizes a table matching the organization's services with needs and interests. In one embodiment, the table further includes a value indicating the degree in which the organization can service such needs and interests. In one embodiment, such a table is completed by an expert in this field. As a result, in one embodiment, ranking engine 203 performs a table look-up to attempt to match the need and interest of the client predicted by deep learning engine 201 with a service provided by the organization. After identifying the matches, ranking engine 203 ranks such matches based on the ability of the organization to service such need and interests, which is determined based on the values in the table that indicate the degree to which the organization can service such needs and interests.

Additionally, as shown in FIG. 2, strategic planning system 105 includes a recommendation engine 204 (also referred to herein as the "recommender system") configured to match a solution with the predicted need and interest of the client (including the predicted future need and interest). A "solution," as used herein, refers to an answer in addressing the client's needs and interests. For example, if the predicted need and interest of the client is automation, security, and network management, then the solution may be to provide the client with cloud services.

In one embodiment, recommendation engine 204 uses a table that consists of a listing of solutions associated with needs and interests. In one embodiment, such a table is pre-filled by an expert in the field. As a result, in one embodiment, recommendation engine 204 performs a table look-up for the solution matching the need and interest predicted by deep learning engine 201.

In one embodiment, recommendation engine 204 uses collaborative filtering. In one embodiment, collaborative filtering arrives at a recommendation that is based on a model of solutions matched with predicted needs and interests. In one embodiment, collaborative filtering uses group knowledge that includes solutions matched with predicted needs and interests.

In one embodiment, recommendation engine 204 uses the algorithm of Pearson correlation to implement collaborative filtering. In another embodiment, recommendation engine 204 uses one of the following algorithms: Bayesian Belief Nets, Markov chains and Rocchio classification.

Furthermore, as shown in FIG. 2, strategic planning system 105 includes a social network analyzer 205 configured to identify key influencers within the client to discuss the solution based on the identified client need or interest. That is, social network analyzer 205 identifies the appropriate contact at the client to discuss such a solution by performing a social network analysis.

A "social network analysis," as used herein, refers to performing a search of social media messages (posts) and social media profiles (e.g., profiles on LinkedIn®) for contacts involving the client. For example, strategic planning system 105 may utilize natural language processing for identifying terms involving the need or interest predicted by deep learning engine 201 within social media messages. For instance, the need or interest of the client in leasing new office space may be identified with terms, such as "lease," "office" and "space" in the social media message. Once such messages are identified, social network analyzer 205 may search and identify any names that are mentioned in the message by matching a term in the social media message to a name within a table filled with the names of people. Social network analyzer 205 may then determine if such a person works at the client by performing a search for a listing of employees employed by the client, such as by searching an online social platform, such as LinkedIn®. Such identified employees may correspond to key influencers within the client.

In one embodiment, individuals may be identified within social media messages based on identifying names within a designated number (e.g., user-designated) of words to a term(s) identified in the social media message associated with the needs and interests predicted by deep learning engine 201. Names within the social media messages may be identified by matching the term in the social media message (term within a designated number of words to a term(s) identified in the social media message associated with the needs and interests predicted by deep learning engine 201) to a name within a table filled with the names of people.

In another example, social network analyzer 205 may search the listing of employees employed by the client, such as by searching an online social platform, such as LinkedIn®, and identify any terms associated with that employee corresponding to the need or interest predicted by deep learning engine 201 using natural language processing. For example, if the need or interest of the client involves cloud computing, then the chief information officer at the company may be identified as a key influencer based on the use of the term "cloud computing" in the chief information officer's online social profile.

Returning to FIG. 1, as discussed above, the structured and unstructured data may be collected and aggregated periodically, including per client. Such data may be collected and aggregated by strategic planning system 105 and then stored in central database 106 connected to strategic planning system 105 as discussed further below.

A description of the hardware configuration of strategic planning system 105 is provided further below in connection with FIG. 3.

System 100 is not to be limited in scope to any one particular network architecture. System 100 may include any number of computing devices 101, social network servers 102, networks 103, repositories 104, strategic planning systems 105 and central databases 106.

Figure 3:
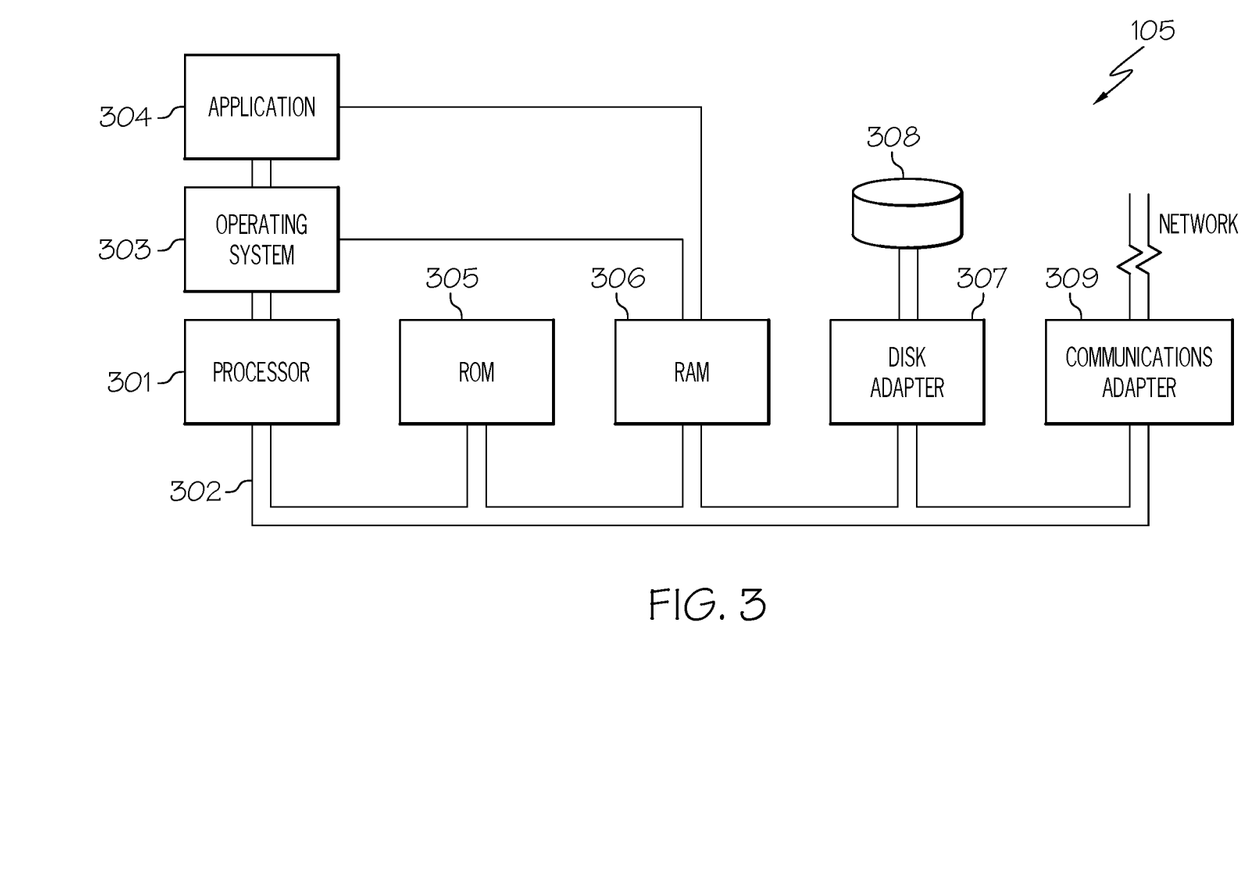
FIG. 3 illustrates an embodiment of the present disclosure of the hardware configuration of the strategic planning system which is representative of a hardware environment for practicing the present disclosure.

Referring now to FIG. 3, FIG. 3 illustrates an embodiment of the present disclosure of the hardware configuration of strategic planning system 105 (FIG. 1) which is representative of a hardware environment for practicing the present disclosure.

Strategic planning system 105 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, deep learning engine 201 (FIG. 2), labeler engine 202 (FIG. 2), ranking engine 203

(FIG. 2), recommendation engine 204 (FIG. 2) and social network analyzer 205 (FIG. 2). Furthermore, application 304 may include, for example, a program for developing a strategic plan using deep learning to determine the interests and needs of the clients so as to effectively and efficiently approach the clients to generate business for the organization as discussed further below in connection with FIG. 4.

Referring again to FIG. 3, read-only memory ("ROM") 305 is connected to system bus 302 and includes a basic input/output system ("BIOS") that controls certain basic functions of strategic planning system 105. Random access memory ("RAM") 306 and disk adapter 307 are also connected to system bus 302. It should be noted that software components including operating system 303 and application 304 may be loaded into RAM 306, which may be strategic planning system's 105 main memory for execution. Disk adapter 307 may be an integrated drive electronics ("IDE") adapter that communicates with a disk unit 308, e.g., disk drive. It is noted that the program for developing a strategic plan using deep learning to determine the interests and needs of the clients so as to effectively and efficiently approach the clients to generate business for the organization, as discussed further below in connection with FIG. 4, may reside in disk unit 308 or in application 304.

Strategic planning system 105 may further include a communications adapter 309 connected to bus 302. Communications adapter 309 interconnects bus 302 with an outside network (e.g., network 103 of FIG. 1) to communicate with other devices, such as social network server 102 and repository 104.

In one embodiment, application 304 of strategic planning system 105 includes the software components of deep learning engine 201, labeler engine 202, ranking engine 203, recommendation engine 204 and social network analyzer 205. In one embodiment, such components may be implemented in hardware, where such hardware components would be connected to bus 302. The functions discussed above performed by such components are not generic computer functions. As a result, strategic planning system 105 is a particular machine that is the result of implementing specific, non-generic computer functions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, typically, strategists, such as the senior leadership of an organization, utilize strategic planning systems in defining the organization's strategy and making decisions on allocating its resources to pursue this strategy. For example, such strategic planning systems may be utilized to develop a strategy for the organization to develop business with existing and potential customers or clients. Strategic planning systems have two major functions: to develop an integrated, coordinated, and consistent long-term plan of action, and to facilitate adaptation of the corporation to environmental change. When introducing and developing such a system, companies commonly concentrate on its integrative aspects. The design of the system, however, should include the function of environmental scanning to make sure that the planning effort also fulfills its adaptive mission. Unfortunately, such strategic planning systems rely upon users inputting data pertaining to the organization's strengths and superior products. However, such information is limiting in that strategic planning systems are not able to determine the interests and needs of both existing and potential customers or clients, including their future interests and needs, which are needed to be known in order to effectively and efficiently approach such existing and potential customers or clients to generate business for the organization. Furthermore, such information is an excessive amount of information thereby causing strategic planning systems to utilize an excessive amount of computing resources in attempting to derive a strategy for the organization to develop business with existing and potential customers or clients.

The embodiments of the present disclosure provide a means for developing a strategic plan using deep learning to determine the interests and needs of the clients (including both existing and potential clients) so as to effectively and efficiently approach the clients to generate business for the organization as discussed below in connection with FIG. 4.

Figure 4:
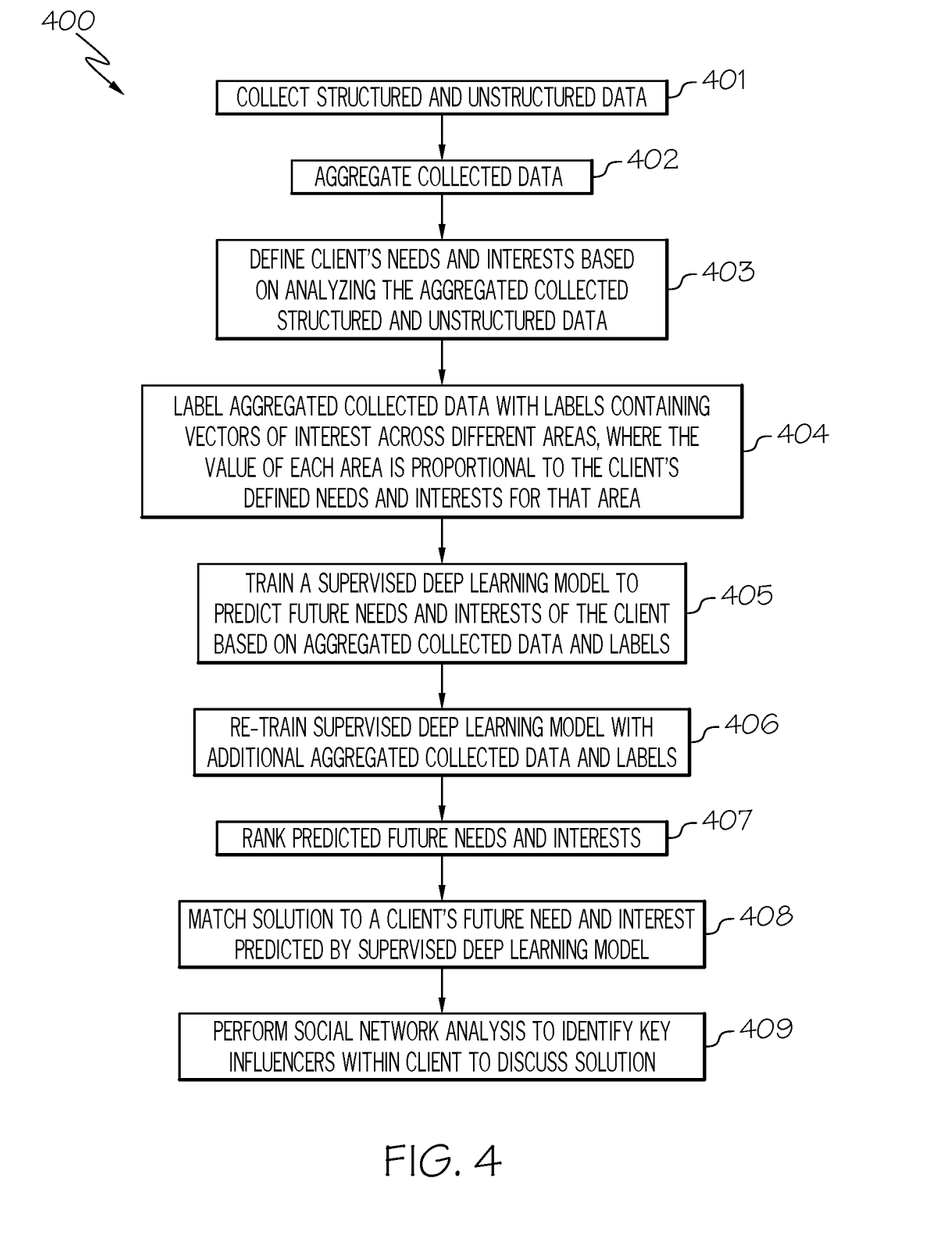
FIG. 4 is a flowchart of a method for developing a strategic plan using deep learning to determine the interests and needs of the clients in accordance with an embodiment of the present disclosure.

FIG. 4 is a flowchart of a method 400 for developing a strategic plan using deep learning to determine the interests and needs of the clients in accordance with an embodiment of the present disclosure.

Referring to FIG. 4, in conjunction with FIGS. 1-3, in step 401, strategic planning system 105 collects structured and unstructured data. "Structured data," as used herein, refers to data that adheres to a predefined data model. Examples of structured data include sales transactions, customer surveys which indicate the client's satisfaction (e.g., a net promotor score may be generated based on responses to customer surveys), marketing responses, global market views, news, etc. "Unstructured data," as used herein, refers to information that either does not have a predefined data model or is not organized in a predefined manner. Examples of such unstructured data include news about the clients, reviews of the clients, content published by the clients, etc.

As previously discussed, such structured and unstructured data may be found in social media posts, which may be collected online by strategic planning system 105. Furthermore, as previously discussed, users of computing devices 101 may post articles, documents, etc., which may include references involving the organization's clients (including both existing and potential clients). Such information (e.g., sales transactions, customer surveys which indicate the client's satisfaction (e.g., a net promotor score may be generated based on responses to customer surveys), marketing responses, global market views, news, including news about the clients, reviews of the clients, content published by the clients, etc.) may be collected online by strategic planning system 105.

Furthermore, some of this information may reside within repositories, which may be publicly accessible via network 103, such as repository 104 connected to network 103. As a result, strategic planning system 105 may access such information from repository 104.

In step 402, strategic planning system 105 aggregates the collected data, such as periodically (e.g., weekly). Furthermore, in one embodiment, such collected data may be aggregated per client (existing and potential clients). In one embodiment, strategic planning system 105 utilizes natural language processing to identify the client associated with the collected data. For instance, strategic planning system 105 may match a term in the data (e.g., article) with a term (e.g., IBM®) in a listing of clients. As a result, strategic planning system 105 may tag such data to the matching client. All of the data tagged to a particular client may then be aggregated for that particular client.

In one embodiment, the aggregated collected data is stored in central database 106.

In step 403, labeler engine 202 of strategic planning system 105 defines the client's needs and interests based on analyzing the aggregated collected structured and unstructured data. As previously discussed, the collected data may be aggregated per client (existing and potential clients). Such data may then be analyzed to define the client's needs and interests.

As discussed above, labeler engine 202 utilizes natural language processing to identify needs and interests in such collected and aggregated data. For example, labeler engine 202 may identify the needs and interests using a statistical model, where the statistical model includes words that are associated with a need or interest. For example, the words identified from a posted article (one of the articles included in the collected and aggregated data) may be used to identify the need or interest most associated with the posted article. For instance, if the posted article includes a description of the client needing to lease new office space due to an expanded workforce, then terms, such as office space and lease, may be associated with the need or interest in leasing new office space.

In one embodiment, the magnitude of such identified needs and interests is determined based on the volume of data that indicates such a need and interest. For example, multiple articles expressing a need for leasing new office space would cause such a need and interest to be associated with a greater magnitude than the need for an expert involving cloud computing based on a job posted by the client for such a position. In one embodiment, the number of times a need or interest for a potential client is identified is stored in a table. Such information may be used to determine the magnitude of such a need or interest for the potential client. That is, such information may be used to determine the extent of such a need or interest by the potential client.

In one embodiment, the magnitude of such identified needs and interests may be expressed in terms of a value, where the higher the value, the greater the magnitude of the associated need and interest. In one embodiment, the vector of the magnitude of such identified needs and interests is normalized so that the magnitudes sum up to the value of 1 as discussed below.

In step 404, labeler engine 202 of strategic planning system 105 labels the aggregated collected structured and unstructured data with labels containing vectors of interests across different areas, where the value of each area is proportional to the client's defined needs and interests for that area.

As discussed above, labeler engine 202 labels the aggregated collected structured and unstructured data, where such labels are vectors of interest across several areas. For example, the areas of interest may correspond to: [cloud storage, machine learning, security, . . . , marketing automation] resulting in a vector of: [0.3, 0.2, 0.1, . . . , 0.3], where the value of an entry is proportional to the magnitude of the client's need and interest for that area. In one embodiment, the vectors are normalized so that the sum of the entries of any given interest vector sums up to the value of 1. In one embodiment, such normalization is utilized by a softmax activation function in the final layer of the neural network embodiment.

In step 405, deep learning engine 201 of strategic planning system 105 trains a supervised deep learning model to predict future needs and interests of the client based on the aggregated collected data and labels.

As discussed above, in one embodiment, deep learning engine 201 uses a machine learning algorithm (e.g., supervised learning) to build a mathematical model based on sample data consisting of structured and unstructured data (e.g., sales transactions, customer surveys which indicate the client's satisfaction (e.g., a net promotor score may be generated based on responses to customer surveys), marketing responses, global market views, news, including news about the clients, reviews of the clients, content published by the clients, etc.) to predict the client's needs and interests (including the client's future needs and interests). Such structured and unstructured data may be obtained and tabulated by experts, who in turn, utilize such information to develop the sample data. Such a data set is referred to herein as the "training data" which is used by the machine learning algorithm of deep learning engine 201 to make predictions or decisions without being explicitly programmed to perform the task. The algorithm iteratively makes predictions on the training data and is corrected by the expert until the predictions achieve the desired accuracy. Examples of such supervised learning algorithms include nearest neighbor, Naïve Bayes, decision trees, linear regression, support vector machines and neural networks.

In one embodiment, a recurrent neural network architecture is used to account for the time dependencies of the data.

In one embodiment, the structured and unstructured data, which may be collected and aggregated periodically, including per client, is used as features of the supervised deep learning model. In one embodiment, the labels of such collected and aggregated data is used as dependent variables of the supervised deep learning model.

In step 406, deep learning engine 201 of strategic planning system 105 re-trains the supervised deep learning model with additional aggregated collected data and labels. In one embodiment, the training data continues to be modified, such as by an expert, until the supervised deep learning model produces an output (predicted future needs and interests of the client) with a desired accuracy. In one embodiment, such an accuracy may be determined over time, such as by determining by an expert if a predicted future need and interest of the client truly ended up being a need and interest of the client.

In step 407, ranking engine 203 of strategic planning system 105 ranks the predicted future needs and interests of the client based on the ability to service the predicted future needs and interests by the organization.

As discussed above, in one embodiment, ranking engine 203 ranks the needs and interests of the client based on the ability of the organization to service the predicted needs and interests (including the predicted future needs and interests). In one embodiment, ranking engine 203 utilizes a table matching the organization's services with needs and interests. In one embodiment, the table further includes a value indicating the degree in which the organization can service such needs and interests. In one embodiment, such a table is completed by an expert in this field. As a result, in one embodiment, ranking engine 203 performs a table look-up to attempt to match the need and interest of the client predicted by deep learning engine 201 with a service provided by the organization. After identifying the matches, ranking engine 203 ranks such matches based on the ability of the organization to service such need and interests, which is determined based on the values in the table that indicate the degree to which the organization can service such needs and interests.

In step 408, recommendation engine 204 of strategic planning system 105 matches a solution to the client's predicted future need and interest predicted by the supervised deep learning model, such as by order of rank. For example, recommendation engine 204 may match a solution to those client's needs and interests that are ranked higher than others. As previously discussed, a "solution," as used herein, refers to an answer in addressing the client's needs and interests. For example, if the predicted need and interest of the client is automation, security, and network management, then the solution may be to provide the client with cloud services.

Furthermore, as discussed above, in one embodiment, recommendation engine 204 uses a table that consists of a listing of solutions associated with needs and interests. In one embodiment, such a table is pre-filled by an expert in the field. As a result, in one embodiment, recommendation engine 204 performs a table look-up for the solution matching the need and interest predicted by deep learning engine 201.

In one embodiment, recommendation engine 204 uses collaborative filtering. In one embodiment, collaborative filtering arrives at a recommendation that is based on a model of solutions matched with predicted needs and interests. In one embodiment, collaborative filtering uses group knowledge that includes solutions matched with predicted needs and interests.

In one embodiment, recommendation engine 204 uses the algorithm of Pearson correlation to implement collaborative filtering. In another embodiment, recommendation engine 204 uses one of the following algorithms: Bayesian Belief Nets, Markov chains and Rocchio classification.

In step 409, social network analyzer 205 of strategic planning system 105 performs a social network analysis to identify key influencers (e.g., individual employed by the client) to discuss the solution.

As discussed above, a "social network analysis," as used herein, refers to performing a search of social media messages (posts) and social media profiles (e.g., profiles on LinkedIn®) for contacts involving the client. For example, strategic planning system 105 may utilize natural language processing for identifying terms involving the need or interest predicted by deep learning engine 201 within social media messages. For instance, the need or interest of the client in leasing new office space may be identified with terms, such as "lease," "office" and "space" in the social media message. Once such messages are identified, social network analyzer 205 may search and identify any names that are mentioned in the message by matching a term in the social media message to a name within a table filled with the names of people. Social network analyzer 205 may then determine if such a person works at the client by performing a search for a listing of employees employed by the client, such as by searching an online social platform, such as LinkedIn®. Such identified employees may correspond to key influencers within the client.

In one embodiment, individuals may be identified within social media messages based on identifying names within a designated number (e.g., user-designated) of words to a term(s) identified in the social media message associated with the needs and interests predicted by deep learning engine 201. Names within the social media messages may be identified by matching the term in the social media message (term within a designated number of words to a term(s) identified in the social media message associated with the needs and interests predicted by deep learning engine 201) to a name within a table filled with the names of people.

In another example, social network analyzer 205 may search the listing of employees employed by the client, such as by searching an online social platform, such as LinkedIn®, and identify any terms associated with that employee corresponding to the need or interest predicted by deep learning engine 201 using natural language processing. For example, if the need or interest of the client involves cloud computing, then the chief information officer at the company may be identified as a key influencer based on the use of the term "cloud computing" in the chief information officer's online social profile.

In one embodiment, the solution and the identified individual(s) are presented to a user of strategic planning system 105 via an interactive dashboard.

In this manner, the principles of the present disclosure enable a strategic planning system to develop a strategic plan using deep learning to determine the interests and needs of the clients so as to effectively and efficiently approach the clients (including both existing and potential clients) to generate business for the organization. Furthermore, by utilizing deep learning, computing resources are more efficiently utilized by no longer requiring users to input data pertaining to the organization's strengths and superior products. Instead, the strategic planning system collects and analyzes structured and unstructured data to understand the changing trends and interests in the market and the client's industry, the emerging challenges for the client, the client satisfaction with current products and services, the competiveness of the client's products and services in the market and the potential increase or decrease of business opportunities with the client. Furthermore, in addition to identifying the client's future needs and interests, the strategic planning system of the present disclosure matches a solution to such a need and interest using a recommender system as well as identifies the appropriate contact at the client to discuss such a solution by performing a social network analysis.

As a result of the foregoing, embodiments of the present disclosure provide a means for improving the technology or technical field of strategic planning systems by reducing the amount of computing resources (e.g., reducing processing resources) that are utilized yet still providing a more accurate strategy plan for the organization.

Furthermore, the present disclosure improves the technology or technical field involving strategic planning systems. As discussed above, strategic planning is an organization's process of defining its strategy, or direction, and making decisions on allocating its resources to pursue this strategy. It is here that priorities are set. It may also extend to control mechanisms for guiding the implementation of the strategy. Strategic planning is executed by strategic planners or strategists, who involve many parties and research sources in their analysis of the organization and its relationship to the environment in which it competes. Strategy generally involves setting strategic goals, determining actions to achieve the goals, and mobilizing resources to execute the actions. A strategy describes how the ends (goals) will be achieved by the means (resources). The senior leadership of an organization is generally tasked with determining strategy. Strategy can be planned (intended) or can be observed as a pattern of activity (emergent) as the organization adapts to its environment or competes. Typically, strategists, such as the senior leadership of an organization, utilize strategic planning systems in defining the organization's strategy and making decisions on allocating its resources to pursue this strategy. For example, such strategic planning systems may be utilized to develop a strategy for the organization to develop business with existing and potential customers or clients. Strategic planning systems have two major functions: to develop an integrated, coordinated, and consistent long-term plan of action, and to facilitate adaptation of the corporation to environmental change. When introducing and developing such a system, companies commonly concentrate on its integrative aspects. The design of the system, however, should include the function of environmental scanning to make sure that the planning effort also fulfills its adaptive mission. Unfortunately, such strategic planning systems rely upon users inputting data pertaining to the organization's strengths and superior products. However, such information is limiting in that strategic planning systems are not able to determine the interests and needs of both existing and potential customers or clients, including their future interests and needs, which are needed to be known in order to effectively and efficiently approach such existing and potential customers or clients to generate business for the organization. Furthermore, such information is an excessive amount of information thereby causing strategic planning systems to utilize an excessive amount of computing resources in attempting to derive a strategy for the organization to develop business with existing and potential customers or clients.

Embodiments of the present disclosure improve such technology by the strategic planning system collecting structured and unstructured data. "Structured data," as used herein, refers to data that adheres to a predefined data model. Examples of structured data include sales transactions, customer surveys which indicate the client's satisfaction (e.g., a net promotor score may be generated based on responses to customer surveys), marketing responses, global market views, news, etc. "Unstructured data," as used herein, refers to information that either does not have a predefined data model or is not organized in a predefined manner. Examples of such unstructured data include news about the clients, reviews of the clients, content published by the clients, etc. The collected structured and unstructured data is then aggregated by the strategic planning system, such as periodically. A client's needs and interests are then defined based on analyzing the aggregated collected structured and unstructured data. In one embodiment, such needs and interests are identified using natural language processing and a statistical model, where the statistical model includes words that are associated with a need or interest. For example, the words identified from a posted article (one of the articles included in the collected and aggregated data) may be used to identify the need or interest most associated with the posted article. The strategic planning system further labels the aggregated collected structured and unstructured data with labels that contain vectors of interest across different areas, where a value of each area is proportional to the client's defined needs and interests for that area. A supervised deep learning model is then trained to predict future needs and interests of the client based on the aggregated collected data and the labels. In one embodiment, the aggregated collected data corresponds to the features of the supervised deep learning model and the labels correspond to the dependent variables of the supervised deep learning model. The predicted future need and interest of the client is then matched with a solution using a recommender system. In one embodiment, the recommender system performs a table look-up for the solution matching the need and interest predicted by the supervised deep learning model. In this manner, the strategic planning system develops a strategic plan using deep learning to determine the interests and needs of the clients so as to effectively and efficiently approach the clients to generate business for the organization. Furthermore, in this manner, the strategic planning system utilizes fewer computing resources (e.g., reducing processing resources) yet still providing a more accurate strategy plan for the organization. Furthermore, in this manner, there is an improvement in the technical field involving strategic planning systems.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for developing a strategic plan by a strategic planning system, the method comprising:
   defining a client's needs and interests based on analyzing structured and unstructured data;
   labeling, by a labeler engine, said structured and unstructured data with labels, wherein said labels contain vectors of interest across different areas, wherein a value of each area is proportional to said client's defined needs and interests for that area;
   training, by a deep learning engine, a supervised deep learning model to predict future needs and interests of said client based on said structured and unstructured data and said labels;
   re-training said supervised deep learning model with additional aggregated collected data and labels;
   modifying training data until said supervised deep learning model produces an output with a desired accuracy, wherein said output comprises said predicted future need and interest of said client;
   ranking said predicted future needs and interests of said client based on ability to service said predicted future needs and interests by an organization; and
   matching a solution with a future need and interest of said client predicted by said supervised deep learning model using a recommender system.

2. The method as recited in claim 1 further comprising:
   performing a social network analysis to identify an individual employed by said client to discuss said solution.

3. The method as recited in claim 2, wherein said solution and said identified individual are presented to a user via an interactive dashboard.

4. The method as recited in claim 1, wherein said unstructured data comprises news about clients, reviews of clients, and content published by clients, wherein said client's needs and interests are identified in said unstructured data using natural language processing and a statistical model.

5. The method as recited in claim 1, wherein said structured and unstructured data corresponds to features of said supervised deep learning model, wherein said labels correspond to dependent variables of said supervised deep learning model.

6. A computer program product for developing a strategic plan by a strategic planning system, the computer program product comprising one or more computer readable storage mediums having program code embodied therewith, the program code comprising programming instructions for:
   defining a client's needs and interests based on analyzing structured and unstructured data;
   labeling, by a labeler engine, said structured and unstructured data with labels, wherein said labels contain vectors of interest across different areas, wherein a value of each area is proportional to said client's defined needs and interests for that area;
   training, by a deep learning engine, a supervised deep learning model to predict future needs and interests of said client based on said structured and unstructured data and said labels;

re-training said supervised deep learning model with additional aggregated collected data and labels;

modifying training data until said supervised deep learning model produces an output with a desired accuracy, wherein said output comprises said predicted future need and interest of said client;

ranking said predicted future needs and interests of said client based on ability to service said predicted future needs and interests by an organization; and matching a solution with a future need and interest of said client predicted by said supervised deep learning model using a recommender system.

7. The computer program product as recited in claim 6, wherein the program code further comprises the programming instructions for:

performing a social network analysis to identify an individual employed by said client to discuss said solution.

8. The computer program product as recited in claim 7, wherein said solution and said identified individual are presented to a user via an interactive dashboard.

9. The computer program product as recited in claim 6, wherein said unstructured data comprises news about clients, reviews of clients, and content published by clients, wherein said client's needs and interests are identified in said unstructured data using natural language processing and a statistical model.

10. The computer program product as recited in claim 6, wherein said structured and unstructured data corresponds to features of said supervised deep learning model, wherein said labels correspond to dependent variables of said supervised deep learning model.

11. A strategic planning system, comprising:

a memory for storing a computer program for developing a strategic plan by said strategic planning system; and a processor connected to said memory, wherein said processor is configured to execute program instructions of the computer program comprising:

defining a client's needs and interests based on analyzing structured and unstructured data;

labeling, by a labeler engine, said structured and unstructured data with labels, wherein said labels contain vectors of interest across different areas, wherein a value of each area is proportional to said client's defined needs and interests for that area;

training, by a deep learning engine, a supervised deep learning model to predict future needs and interests of said client based on said structured and unstructured data and said labels;

re-training said supervised deep learning model with additional aggregated collected data and labels;

modifying training data until said supervised deep learning model produces an output with a desired accuracy, wherein said output comprises said predicted future need and interest of said client;

ranking said predicted future needs and interests of said client based on ability to service said predicted future needs and interests by an organization; and matching a solution with a future need and interest of said client predicted by said supervised deep learning model using a recommender system.

12. The strategic planning system as recited in claim 11, wherein the program instructions of the computer program further comprise:

performing a social network analysis to identify an individual employed by said client to discuss said solution.

13. The strategic planning system as recited in claim 12, wherein said solution and said identified individual are presented to a user via an interactive dashboard.

14. The strategic planning system as recited in claim 11, wherein said unstructured data comprises news about clients, reviews of clients, and content published by clients, wherein said client's needs and interests are identified in said unstructured data using natural language processing and a statistical model.

* * * * *